United States Patent
Kitai et al.

(10) Patent No.: US 9,906,682 B2
(45) Date of Patent: Feb. 27, 2018

(54) CONTROL DEVICE AND PRINTING APPARATUS

(71) Applicant: FUJI XEROX CO., LTD., Tokyo (JP)

(72) Inventors: Tsubasa Kitai, Kanagawa (JP); Noriaki Tanaka, Kanagawa (JP); Satoshi Watanabe, Kanagawa (JP); Yusaku Kurihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 15/253,956

(22) Filed: Sep. 1, 2016

(65) Prior Publication Data
US 2017/0289394 A1 Oct. 5, 2017

(30) Foreign Application Priority Data
Mar. 29, 2016 (JP) .................. 2016-065117

(51) Int. Cl.
*G06K 15/00* (2006.01)
*H04N 1/34* (2006.01)
*H04L 12/58* (2006.01)
*H04L 29/08* (2006.01)
*H04N 1/00* (2006.01)

(52) U.S. Cl.
CPC .............. *H04N 1/346* (2013.01); *H04L 51/08* (2013.01); *H04L 67/306* (2013.01); *H04N 1/00925* (2013.01)

(58) Field of Classification Search
CPC .... H04N 1/346; H04N 1/00925; H04L 51/08; H04L 67/306
USPC ....................................................... 358/1.14
See application file for complete search history.

(56) References Cited

U.S. PATENT DOCUMENTS

| 2004/0223778 A1* | 11/2004 | Zwiefelhofer | ......... G03G 21/02 399/79 |
| 2009/0207440 A1* | 8/2009 | Kaneko | .................. G03G 21/02 358/1.15 |
| 2010/0128326 A1* | 5/2010 | Hiraoka | ............. H04N 1/00408 358/474 |

(Continued)

FOREIGN PATENT DOCUMENTS

JP 2013-103386 5/2013

OTHER PUBLICATIONS

Abstract and machine translation of JP 2013-103386.

*Primary Examiner* — Neil R McLean
(74) *Attorney, Agent, or Firm* — Fildes & Outland, P.C.

(57) ABSTRACT

A control device includes a prohibition unit that prohibits a user from using an electronic apparatus in a case where a sum of a cumulative used amount of the electronic apparatus by the user for a predetermined time period and a new used amount which is newly instructed by the user exceeds a permitted amount for the predetermined time period; an acquiring unit that acquires charging destination information for the user in a case where the prohibition unit prohibits the user from using the electronic apparatus; an output unit that outputs charging information for excess over the permitted amount of the user, using the charging destination information in a case where the charging destination information is acquired by the acquiring unit; and a permission unit that permits the user to use the electronic apparatus after the charging information is output.

9 Claims, 3 Drawing Sheets

(56) References Cited

U.S. PATENT DOCUMENTS

2010/0268591 A1* 10/2010 Gnanasambandam  G06F 3/1203
                                                      705/14.37
2014/0327922 A1* 11/2014 Kamishiro ......... H04N 1/00244
                                                      358/1.13

* cited by examiner

FIG. 2

| USER ID | NAME | NAME OF DEPARTMENT TO WHICH USER BELONGS |
|---------|------|------------------------------------------|
| ••• | ••• | ••• |
| ••• | ••• | ••• |
| ⋮ | ⋮ | ⋮ |

CONTROL DEVICE AND PRINTING APPARATUS

CROSS-REFERENCE TO RELATED APPLICATIONS

This application is based on and claims priority under 35 USC 119 from Japanese Patent Application No. 2016-065117 filed on Mar. 29, 2016.

BACKGROUND

Technical Field

The present invention relates to a control device and a printing apparatus.

SUMMARY

According to an aspect of the invention, there is provided a control device including: a prohibition unit that prohibits a user from using an electronic apparatus in a case where a sum of a cumulative used amount of the electronic apparatus by the user for a predetermined time period and a new used amount which is newly instructed by the user exceeds a permitted amount for the predetermined time period, the permitted amount being permitted for the user; an acquiring unit that acquires charging destination information regarding a charging destination of a usage fee for the user in a case where the prohibition unit prohibits the user from using the electronic apparatus; an output unit that outputs charging information regarding charging of the usage fee of the electronic apparatus for excess over the permitted amount of the user, using the charging destination information in a case where the charging destination information is acquired by the acquiring unit; and a permission unit that permits the user to use the electronic apparatus after the charging information is output.

BRIEF DESCRIPTION OF DRAWINGS

Exemplary embodiments of the present invention will be described in detail based on the following figures, wherein:

FIG. 2 is a diagram showing a charging destination information DB; and

DETAILED DESCRIPTION

Figure 1:
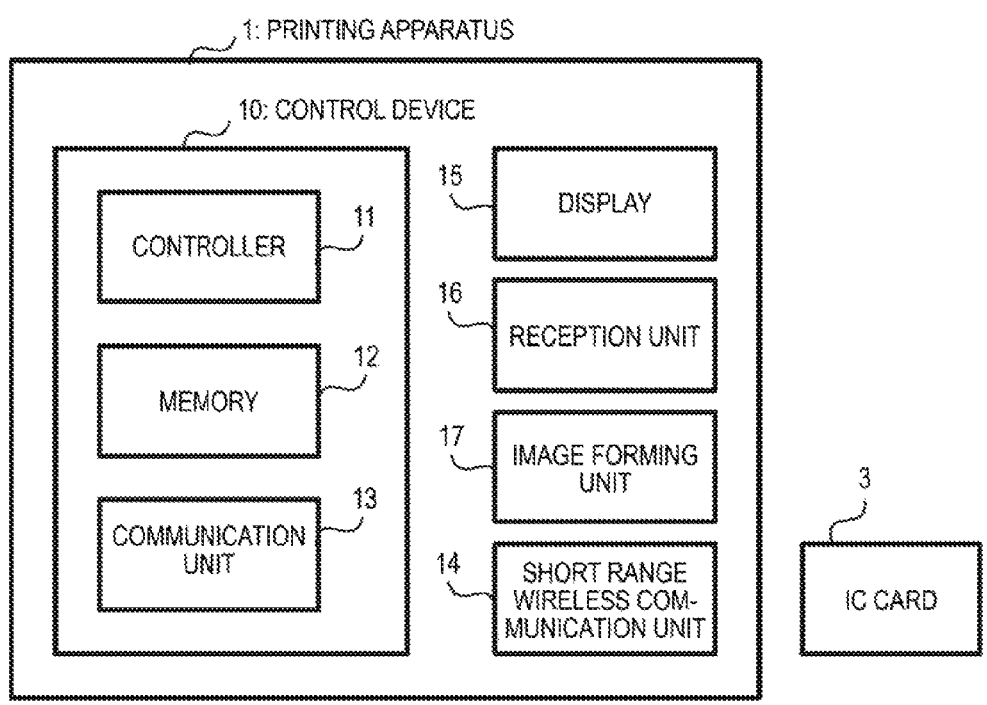
FIG. 1 is a diagram showing a hardware configuration of a printing apparatus.

An example of exemplary embodiments of the invention will now be described. FIG. 1 is a diagram showing a hardware configuration of a printing apparatus 1. The printing apparatus 1 is an example of electronic apparatus according to the exemplary embodiment. The printing apparatus 1 prints out an image based on printing data. A control device 10 includes a controller 11, a memory 12, and a communization unit 13, and controls the printing apparatus 1. The control device 10 may be configured as an external device of the printing apparatus 1, and the control device 10 and the printing apparatus 1 may be configured to communicate with each other through a communication unit.

The controller 11 includes an arithmetic operation device such as a Central Processing Unit (CPU) and a storage device such as a Read Only Memory (ROM) or a Random Access Memory (RAM). The ROM stores hardware or firmware in which the procedure of the start-up of an Operating System (OS) is described. The RAM stores data when the CPU executes an arithmetic operation. The memory 12 includes, for example, a hard disk storage device, and stores an OS, application programs, and the like. The communication unit 13 is a communication interface (I/F) for connecting the printing apparatus 1 to a Local Area Network (LAN).

A short range wireless communication unit 14 is a reader-writer that performs communication with, for example, a non-contact type integrated circuit (IC) card 3. The IC card 3 stores a user ID that identifies a user account of the printing apparatus 1. The short range wireless communication unit 14 periodically transmits an inquiry signal.

When an operator passes the IC card 3 over the printing apparatus 1, the IC card 3 receives the inquiry signal.

The IC card 3 transmits a user ID to the short range wireless communication unit 14 in response to the inquiry signal. A user ID of a user given the user account of the printing apparatus 1 is stored in the memory 12 in advance. The controller 11 permits the use of the printing apparatus 1 in a case where the user ID received by the short range wireless communication unit 14 is stored in the memory 12.

In general, there are a case where an individual uses one user ID and a case where plural individuals included in a group share one user ID, but a user in the following description is a unit related to the used amount of the printing apparatus 1 and means an individual or a group which is associated with the user ID. On the other hand, a person who operates the printing apparatus 1 is referred to as an operator.

The display 15 is, for example, a liquid crystal display, and displays a screen for operating the printing apparatus 1. The reception unit 16 is, for example, a touch panel provided to cover a display surface of the display 15, and receives an operation to the printing apparatus 1.

The image forming unit 17 forms an image on a recording medium based on raster data. The recording medium is, for example, a printing sheet (hereinafter, referred to as a sheet). The configuration of the image forming unit 17 may be any configuration such as an electrophotographic type or an inkjet type. The memory 12 stores a cumulative used amount indicating the number of sheets used in printing. The controller 11 adds the number of sheets used for printing to a cumulative used amount every time printing is performed. In addition, the controller 11 initializes a cumulative used amount to zero at a time point when a calendar month changes. In other words, the cumulative used amount is the number of sheets that have been printed this month.

FIG. 2 is a diagram showing a charging destination information DB. A charging destination database (DB) stores a user ID and charging destination information in association with each other. Examples of the charging destination information include a name of a user given the user ID, a name of a department to which the user belongs, and the like.

Figure 3:
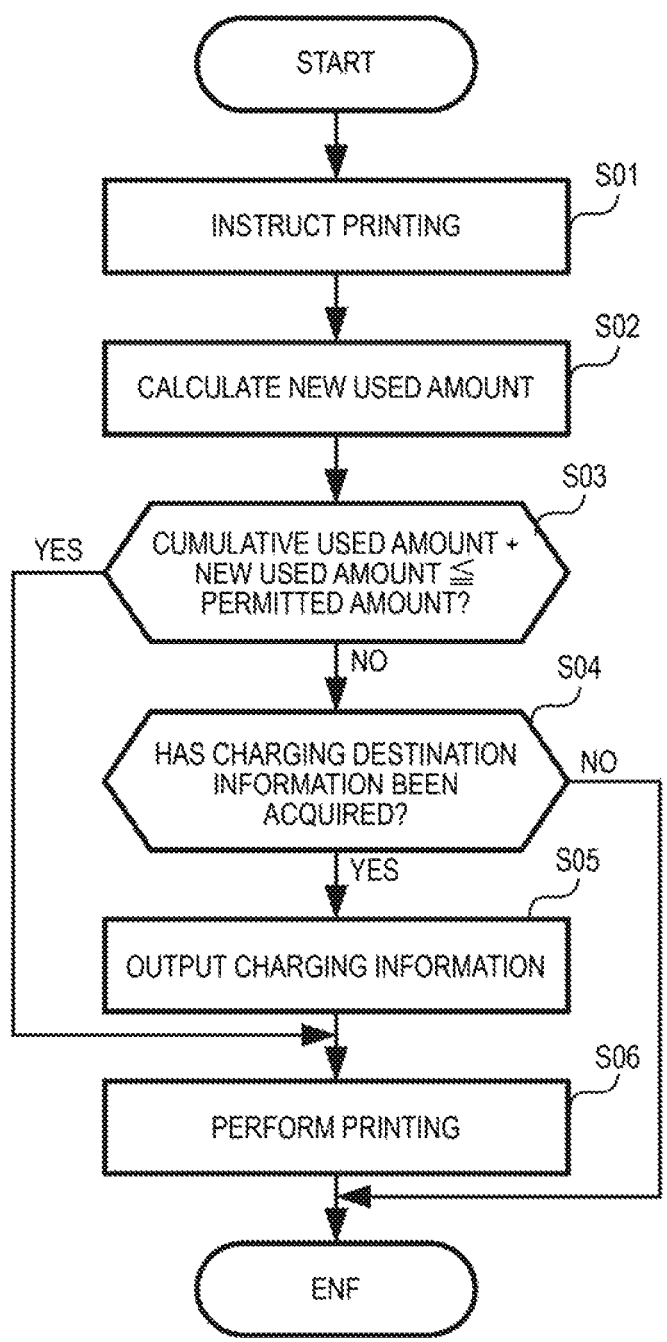
FIG. 3 is a flow chart showing the procedure of a process according to an exemplary embodiment.

FIG. 3 is a flow chart showing the procedure of a process according to an exemplary embodiment. The controller 11 of the printing apparatus 1 performs the following process in accordance with an application program installed in the printing apparatus 1.

In step S01, the controller 11 receives a print instruction. For example, an operator gives an instruction for copying to the reception unit 16, and the instruction is output to the controller 11.

In step S02, the controller 11 calculates a new used amount. Specifically, the controller 11 calculates the number of sheets newly used (new used amount) based on the print instruction.

In step S03, the controller 11 reads out the cumulative used amount from the memory 12, and determines whether the sum of the cumulative used amount and the new used amount is equal to or less than a permitted amount of this month. In a case where the sum of the cumulative used amount and the new used amount is equal to or less than the permitted amount of this month (step S03: YES), the process of the controller 11 proceeds to step S06. In a case where the sum of the cumulative used amount and the new used amount is not equal to or less than the permitted amount of this month (step S03: NO), the process of the controller 11 proceeds to step S04.

In step S04, the controller 11 acquires charging destination information. Specifically, the controller 11 acquires charging destination information corresponding to a user ID, received by the short range wireless communication unit 14, from the charging destination information DB. In a case where the charging destination information is acquired (step S04: YES), the process of the controller proceeds to step S05. In a case where charging destination information is not acquired (step S04: NO), the controller terminates the process.

In step S05, the controller 11 outputs charging information. Specifically, the controller 11 generates data of a bill in which the acquired charging destination information, a charged amount, a payment destination, a payment method, and the like are described in a predetermined form, and outputs the data to the image forming unit 17. The image forming unit 17 prints the bill based on the data on a sheet.

In step S06, the controller 11 outputs raster data based on a print instruction to the image forming unit 17 and executes printing.

This exemplary embodiment is an example of a control device including a prohibition unit that prohibits a user from using electronic apparatus in a case where the sum of a cumulative used amount of the electronic apparatus of the user during a predetermined time period and a new used amount which is newly instructed by the user exceeds a permitted amount during the predetermined time period which is permitted for the user, an acquiring unit that acquires charging destination information regarding a charging destination of a usage fee for the user in a case where the prohibition unit prohibits the user from using the electronic apparatus, an output unit that outputs charging information regarding the charging of a usage fee of the electronic apparatus which exceeds the permitted amount for the user, using the charging destination information in a case where the charging destination information is acquired by the acquiring unit, and a permission unit that permits the user to use the electronic apparatus after the charging information is output. When a system for collecting a charge by issuing a bill is developed, a problem does not occur even when the collection of a charge on the spot is omitted during the use of the electronic apparatus and the use of electronic apparatus is permitted. Accordingly, according to this exemplary embodiment, a process for using electronic apparatus in excess of a permitted amount is simplified as compared to a configuration in which a charge is collected on the spot.

In addition, in this exemplary embodiment, the output unit prints the charging information. According to such a configuration, the recording of charging remains as printed matter.

The above-described exemplary embodiment may be modified as in the following modification example. Plural modification examples may be combined with each other.

First Modification Example

A bill may be transmitted to a user by an e-mail. Specifically, e-mail addresses of users are stored in a charging destination DB, an e-mail address of a user prohibited from using a printing apparatus is acquired from the charging destination DB, and an e-mail having data of a bill attached thereto is sent to the e-mail address. Such configuration is an example of a configuration in which the acquiring unit acquires an e-mail address of the user as the charging destination information, and the output unit sends an e-mail having the charging information attached thereto to the acquired e-mail address.

In addition, an e-mail address for each department may be stored in a charging destination DB, and an e-mail having a bill attached thereto may be sent to an e-mail address of a department to which a user prohibited from using a printing apparatus belongs, in a case where an e-mail address of the user is not capable of being acquired from the charging destination DB. Such configuration is an example of a configuration in which the acquiring unit acquires an e-mail address of a group to which the user belongs, in a case where the e-mail address is not capable of being acquired.

Second Modification Example

In a case where any charging destination information is not also capable of being acquired, charging destination information for emergency may be used. For example, e-mail addresses of a general affair department, an accounting department, and the like are stored in a charging destination DB as charging destination information for emergency, and the charging destination information for emergency is acquired in a case where an e-mail address of a user prohibited from using a printing apparatus, an e-mail address of a department to which the user belongs, and the like are not capable of being acquired from the charging destination DB. In a general affair department, an accounting department, and the like, a name of a user corresponding to a user ID and a department to which the user belongs are examined to thereby send a bill. Such a configuration is an example of a configuration in which the acquiring unit acquires charging destination information which is set in advance in the electronic apparatus, in a case where the charging destination information is not capable of being acquired.

Third Modification Example

When another user's approval is obtained, the use of a printing apparatus exceeding a permitted amount may be permitted. Specifically, a controller displays a list of approvers. The term "approver" as used herein refers to an employee having authority to give approval for charging information. A user designates an approver from the list and transmits an e-mail including charging information. The e-mail is described in, for example, a mark-up language.

When the approver opens the e-mail, text indicating the charging information, a widget for selecting approval or disapproval, and the like are displayed. The approver performs an operation of approving the charging information when there is no problem in contents of the charging information. With such an operation, a response indicating the approval of the charging information is sent to the printing apparatus, and thus the user is permitted to use the printing apparatus. Such a configuration is an example of a configuration in which a requesting unit that requests another user to pay for a use charge of the electronic apparatus which exceeds the permitted amount for the user after the charging information is output is provided, and the permission unit permits the user to use the electronic apparatus in a case where approval is obtained with respect to the request.

Fourth Modification Example

A configuration in which a user without user account is permitted to use a printing apparatus may be adopted. The wording "user without user account" as used herein refers to, for example, an employee of a business partner, a worker who is temporarily engaged, or the like. In this case, since charging destination information is not stored in a charging destination DB, a user inputs information, such as a name and a department to which the user belongs, to a reception unit, and thus a controller generates charging information in which the information, an amount of money, and the like are described. Next, the controller displays a list of approvers. The term "approver" as used herein refers to an employee having authority to give approval for charging information and having a user account. A user designates an approver from the list and transmits an e-mail including charging information. A process after the transmission is the same as that in the third modification example. Such configuration is an example of a configuration in which the prohibition unit prohibits a user having no user account from using the electronic apparatus, the acquiring unit inputs charging destination information regarding a charging destination of a usage fee for the user without user account to thereby acquire the charging destination information, the output unit outputs charging information regarding the charging of a use charge of the electronic apparatus for the user having no user account using the acquired charging destination information, and the permission unit permits the user having no user account to use the electronic apparatus in a case where approval of the user having user account is obtained.

Fifth Modification Example

A budget of a project in which a user participates may be appropriated to the use of a printing apparatus. Specifically, an identification number of a project in which a user participates and of which the budget is allowed to be appropriated for a cost of printing, a project name, an amount of the budget, and the like are stored in a charging destination DB. A controller permits the use of electronic apparatus within a range of the budget of the project corresponding to a user ID of a user who is prohibited from using the electronic apparatus. Such a configuration is an example of a configuration in which the acquiring unit acquires budget information indicating the budget of the project associated with the user, in a case where the prohibition unit prohibits the user from using the electronic apparatus, and the permission unit permits the user to use the electronic apparatus within the range of the budget of the project designated by the user after the charging information is output.

Sixth Modification Example

As the used amount, the number of pages may be used instead of the number of sheets.

A Unit of a time period may be any length of time such as weeks or days.

Seventh Modification Example

In the exemplary embodiment, a description has been given of an example in which the invention is applied to the management of the used amount (the number of printed sheets) of a printing apparatus, but it may be applied to the management of used amount of electronic equipment other than the printing apparatus, such as the used amount (the number of read sheets) of an image scanner or the used amount (the number of transmitted sheets) of a facsimile.

In the exemplary embodiment, a description has been given of an example in which the above-mentioned functions are realized by an application program, but some or all of the above-mentioned functions may be mounted in a hardware circuit. In addition, the application program may be provided by being recorded in a computer readable recording medium such as an optical recording medium or a semiconductor memory, or the program may be read from the recording medium to be installed. In addition, the program may be provided by an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   a prohibition unit that prohibits a user from using an electronic apparatus in a case where a sum of a cumulative used amount of the electronic apparatus by the user for a predetermined time period and a new used amount which is newly instructed by the user exceeds a permitted amount for the predetermined time period, the permitted amount being permitted for the user;
   an acquiring unit that acquires charging destination information regarding a charging destination of a usage fee for the user in a case where the prohibition unit prohibits the user from using the electronic apparatus;
   an output unit that outputs charging information regarding charging of the usage fee of the electronic apparatus for excess over the permitted amount of the user, using the charging destination information in a case where the charging destination information is acquired by the acquiring unit;
   a permission unit that permits the user to use the electronic apparatus after the charging information is output; and
   at least one central processing unit configured to serve as the prohibition unit, the acquiring unit, the output unit, and the permission unit.

2. The control device according to claim 1, wherein the output unit prints the charging information.

3. The control device according to claim 1, wherein the acquiring unit acquires an e-mail address of the user as the charging destination information, and the output unit sends an e-mail to which the charging information is attached to the acquired e-mail address.

4. The control device according to claim 3,
wherein, in a case where the e-mail address of the user is not capable of being acquired, the acquiring unit acquires an e-mail address of a group to which the user belongs.

5. The control device according to claim 1,
wherein, in a case where charging destination information regarding the user is not capable of being acquired, the acquiring unit acquires charging destination information which is set in advance in the electronic apparatus as the charging destination information.

6. The control device according to claim 1, further comprising:
a requesting unit that requests approval by another user to pay for a usage fee of the electronic apparatus for the excess over the permitted amount of the user after the charging information is output,
wherein the at least one central processing unit is configured to serve as the requesting unit, and
the permission unit permits the user to use the electronic apparatus in a case where the approval is obtained with respect to the request.

7. The control device according to claim 1,
wherein the prohibition unit prohibits a user without user account from using the electronic apparatus,
the acquiring unit acquires the charging destination information by allowing the user without user account to input charging destination information regarding a charging destination of a usage fee for the user without user account,
the output unit outputs charging information regarding charging of the usage fee of the electronic apparatus for the user without user account, using the acquired charging destination information, and
the permission unit permits the user without user account to use the electronic apparatus in a case where approval by the user with user account is obtained.

8. The control device according to claim 1,
wherein the acquiring unit acquires budget information indicating a budget of a project associated with the user, in a case where the prohibition unit prohibits the user from using the electronic apparatus, and
the permission unit permits the user to use the electronic apparatus within a range of a budget of a project designated by the user after the charging information is output.

9. A printing apparatus comprising:
a prohibition unit that prohibits a user from printing in a case where a sum of a cumulative number of printed sheets of the user for a predetermined time period and a new number of printed sheets, which is newly instructed by the user exceeds a permitted number of sheets for the predetermined time period, the permitted number of sheets being permitted for the user;
an acquiring unit that acquires charging destination information regarding a charging destination of a printing fee for the user in a case where the prohibition unit prohibits the user from printing;
an output unit that outputs charging information regarding charging of the printing fee which exceeds the permitted number of sheets of the user, using the charging destination information in a case where the charging destination information is acquired by the acquiring unit;
a permission unit that permits the user to print after the charging information is output; and
at least one central processing unit configured to serve as the prohibition unit, the acquiring unit, the output unit, and the permission unit.

* * * * *